United States Patent
Bendix et al.

(10) Patent No.: US 6,624,239 B1
(45) Date of Patent: Sep. 23, 2003

(54) COATING POWDER SLURRY WITH MICROENCAPSULATED PARTICLES, AND PRODUCTION AND USE OF THE SAME

(75) Inventors: Maximilian Bendix, Oelde (DE); Ulrich Poth, Münster (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/806,814

(22) PCT Filed: Sep. 27, 1999

(86) PCT No.: PCT/EP99/07161
§ 371 (c)(1),
(2), (4) Date: May 7, 2001

(87) PCT Pub. No.: WO00/22023
PCT Pub. Date: Apr. 20, 2000

(30) Foreign Application Priority Data

Oct. 9, 1998 (DE) ......................... 198 46 650

(51) Int. Cl.$^7$ ............... C08J 3/00; C08K 3/20; C08L 75/00; C08F 8/30; C08F 283/04
(52) U.S. Cl. ............. 524/591; 428/423.1; 524/507; 524/839; 524/840; 525/123; 525/455
(58) Field of Search ................. 524/591, 839, 524/840; 525/123, 455; 428/423.1

(56) References Cited

U.S. PATENT DOCUMENTS

| | | | |
|---|---|---|---|
| 3,781,379 A | 12/1973 | Theodore et al. | 260/836 |
| 4,091,048 A | 5/1978 | Labana et al. | 260/836 |
| 4,605,756 A | 8/1986 | Gröogler et al. | 560/351 |
| 4,888,124 A | 12/1989 | Blum et al. | |

FOREIGN PATENT DOCUMENTS

| | | | | |
|---|---|---|---|---|
| CA | 2069719 | 5/1992 | ............ | C09D/5/93 |
| CA | 2147479 | 10/1993 | ............ | C09D/5/03 |
| CA | 2255611 | * 12/1997 | | |
| DE | 22 14 650 B2 | 3/1972 | | |
| DE | 25 47 124 A1 | 10/1975 | ............ | C09D/3/64 |
| DE | 27 49 576 B2 | 11/1977 | ........ | C08F/220/18 |
| DE | 31 12 054 A1 | 3/1981 | ........... | C08G/18/80 |
| DE | 32 28 670 A1 | 7/1982 | ........... | C08G/18/80 |
| DE | 32 28 724 A1 | 7/1982 | ........... | C08G/18/70 |
| DE | 32 30 757 A1 | 8/1982 | ........... | C08G/18/80 |
| DE | 34 03 500 A1 | 2/1984 | ........... | C08G/18/80 |
| DE | 35 17 333 A1 | 5/1985 | ........ | C07C/119/048 |
| DE | 35 29 530 A1 | 8/1985 | ........... | D06P/1/642 |
| DE | 43 35 796 A1 | 10/1993 | ........... | C08G/18/79 |
| DE | 44 06 157 A1 | 2/1994 | ............ | C09D/5/46 |
| DE | 196 13 547 A1 | 4/1996 | ............ | C09D/5/46 |
| DE | 196 23 554 A1 | 4/1996 | ......... | C07C/211/50 |
| DE | 196 21 836 A1 | 5/1996 | ............ | C09D/5/46 |
| EP | 0 003 765 A1 | 2/1978 | ........... | C07D/251/34 |
| EP | 0 010 589 A1 | 9/1978 | ......... | C07D/251/34 |
| EP | 0 047 452 A1 | 9/1980 | ......... | C07D/251/34 |
| EP | 0 062 780 A1 | 3/1981 | ........... | C08G/18/70 |
| EP | 0 062 780 A1 | 3/1982 | ........... | C08G/18/70 |
| EP | 0 100 507 B1 | 7/1982 | ........... | C08G/18/72 |
| EP | 0 100 508 B1 | 7/1982 | ........... | C08G/18/72 |
| EP | 0 187 105 A1 | 10/1984 | ........... | C07D/251/34 |
| EP | 0 153 579 A2 | 1/1985 | ........... | C08G/18/70 |
| EP | 0 160 517 B1 | 4/1985 | ........... | A61F/13/16 |
| EP | 219 131 | 10/1986 | ........... | C08G/18/10 |
| EP | 0 330 966 A1 | 2/1988 | ......... | C07D/251/34 |
| EP | 0 299 420 A2 | 7/1988 | ............ | C09D/3/58 |
| EP | 0 431 413 A2 | 12/1989 | ........... | C08G/18/32 |
| EP | 0 408 465 A1 | 6/1990 | ........... | C08G/18/42 |
| EP | 0 510 476 A1 | 4/1992 | ........... | C08G/18/70 |
| EP | WO 96/32452 | 10/1996 | ......... | C09D/133/06 |
| EP | 0 805 171 A1 | 4/1997 | ........... | C08G/18/08 |
| EP | 0 978 614 A2 | 7/1999 | ........... | E05B/65/20 |
| WO | WO 94/09913 | 5/1994 | ............ | B05D/1/00 |

* cited by examiner

Primary Examiner—Patrick D. Niland

(57) ABSTRACT

A powder coating slurry, especially a powder clearcoat slurry, comprising at least one hydroxyl-containing binder A, at least one polyisocyanate crosslinking agent B, and water, where 1) the hydroxyl-containing binders A and the polyisocyanates B have been homogenized such that not less than 30, preferably not less than 60 and in particular not less than 90% by weight of the polyisocyanate B are present in solution or dispersion in the particles comprising the binders A, and 2) the particles of the crosslinking agent B which may still be present in the aqueous phase, and the particles comprising the binders A and the crosslinking agents B, have been stabilized, by way of the isocyanate groups present on their surface, by means of a deactivator added to the aqueous phase.

19 Claims, No Drawings

COATING POWDER SLURRY WITH MICROENCAPSULATED PARTICLES, AND PRODUCTION AND USE OF THE SAME

The present invention relates to a powder coating slurry, especially a powder clearcoat slurry, comprising at least one hydroxyl-containing binder A and a crosslinking agent B containing free isocyanate groups, and also water, the components being in the form of microencapsulated particles. The invention further relates to a process for preparing such a powder coating slurry and to its use for producing coated substrates.

In the context of the present invention, a powder coating slurry is a dispersion of particles of solid film-forming coating materials in water. Coating material particles may be of like or different composition. For example, the particles may comprise both a binder A or a binder mixture A and a crosslinking agent mixture B. Alternatively, a fraction of the particles of coating material may consist substantially of the binder A or binder mixture A, and another fraction may consist substantially of the crosslinking agent B or crosslinking agent mixture B. Furthermore, the particles of coating material may comprise customary and known additives, where these are not present separately in solution or dispersion in the water.

For the production of clearcoats, a very wide variety of coating materials are known. Clearcoats of high resistance to chemicals, solvents, acid rain and weathering are obtained from coating materials based on hydroxyl-containing polyacrylates (polyhydroxy-polyacrylates) which are crosslinked using free polyisocyanates. It is disadvantageous here firstly that the systems in question are two-component systems and secondly that the fraction of organic solvents is in the range from 40 to 45% by weight.

In order to avoid solvent emissions, therefore, a variety of powder clearcoat materials were developed.

For instance, powder clearcoat materials based on hydroxyl-containing polymers and block polyisocyanates are known where the blocking agents used comprise epsilon-caprolactam and/or ketoximes. Disadvantages of these powder coating materials are the need for special application equipment, sensitivity to contamination, the need for high film thicknesses for practical leveling, and high baking temperatures. The requirement for special application equipment is a hindrance to the integration of the powder coating technologies into existing coating lines, for economic and technological reasons, especially since it necessitates a partial refit of the coating lines. The requirement for high film thicknesses results from the relatively large particles, of approximately 25 micrometers in size, and is disruptive on economic grounds and for reasons of the weight.

Also known are powder clearcoats based on epoxy-functional polyacrylates which can be crosslinked with polycarboxylic acids or their anhydrides. These too have the disadvantages set out above. Moreover, they fail to attain the resistance of solventborne two-component clearcoats. The same applies to the known powder clearcoats based on hydroxyl-containing polyacrylates and polyisocyanates in accordance with the German patent DE-A-44 06 157.

Powder coating slurries are known, for example, from patents DE-A-196 13 554 and WO 96/32452. They are based on epoxy-functional polyacrylates which are crosslinked using polycarboxylic acids. These known powder coating slurries can be processed on conventional application equipment and contain virtually no organic solvents. However, they are capable of further optimization, so that the clearcoats produced from them attain the properties profile of the two-component clearcoats.

As far as the term "free isocyanate groups" is concerned, in the context of the present invention the following explanations and definitions are necessary. A polyisocyanate whose isocyanate groups have predominantly been protected with a blocking agent contains virtually no remaining free isocyanate groups. The use of such block polyisocyanates in coating materials, however, has the disadvantage that, when the isocyanate groups are liberated during baking, there is very considerable release of blocking agent and products resulting therefrom, which is disadvantageous for reasons of environmental protection and which frequently leads to lower popping limits. The latter means that, during baking, gas bubbles are formed in the coatings if a certain film thickness is exceeded. Consequently, polyisocyanates were developed which were present in the form of discrete particles and whose polyisocyanate groups at the particle surface were reacted with a deactivator. The concept of reaction in this case embraces not only chemical reactions of the superficial isocyanate groups with the deactivator but also a physical blocking of the surface of the particles, by physisorption or chemisorption, for example. Within the volume of the particles, the isocyanate groups are in any case free. The proportion of the isocyanate groups reactive with a deactivator in relation to the free isocyanate groups of the volume of a particle is usually below 0.3, as a general rule considerably below 0.1. Consequently, microencapsulated polyisocyanates of this kind, as they are known, are counted among the unblocked polyisocyanates. Where a microencapsulated polyisocyanate is heated with a binder, the polyisocyanate particles melt and the formerly purely geometrically and/or physically protected isocyanate groups of the volume become accessible for the crosslinking reactions and are able to crosslink the binder.

Microencapsulation is known per se and is described, for example, in the patents DE-A-32 28 670, DE-A-32 28 724, DE-A-31 12 054, DE-A-32 30 757, U.S. Pat. No. 4,888,124 or EP-A-0 510 476. Here, in general, the solid, finely ground polyisocyanate is dispersed in a liquid polyol which at the same time forms the reactive countercomponent for crosslinking. These systems are used to produce foams or underbody protection. They are not suitable for the preparation of coating materials where the surface leveling and gloss requirements are high.

It is an object of the present invention to find a one-component coating material, especially a one-component clearcoat material, which in particular produces clearcoats which match the clearcoats produced from two-component coating materials, especially in terms of gloss, and which may be applied using the customary spray application equipment while exhibiting as low a degree of pollutant emissions as powder clearcoat materials. Furthermore, the one-component coating material should have excellent storage stability and good leveling, even at a low film thickness.

The invention accordingly provides the novel powder coating slurry, in particular the novel powder clearcoat slurry, comprising at least one hydroxyl-containing binder A, at least one polyisocyanate crosslinking agent B, and water, where 1) the hydroxyl-containing binders A and the polyisocyanates B have been homogenized such that not less than 30, preferably not less than 60 and in particular not less than 90% by weight of the polyisocyanate B are present in solution or dispersion in the particles comprising the binders A, and 2) the particles of the polyisocyanate B which may still be present in the aqueous phase, and the particles comprising the binders A and the polyisocyanates B, have been stabilized, by way of the isocyanate groups present on their surface, by means of a deactivator added to the aqueous phase.

Surprisingly, therefore, unblocked polyisocyanates B may be dispersed together with a binder A in water so as to form a storage-stable powder coated slurry if the microencapsulation of the particles in the aqueous phase is conducted by means of the deactivator. Since the deactivation is predominantly not carried out with the binder A, it is possible to obtain coatings, especially clearcoats, having very good leveling and high gloss, even at film thicknesses which are atypically low for powder coatings. The coatings and clearcoats produced from the powder coating slurry of the invention have resistance properties which come close to those of clearcoats produced from two-component systems. Finally, the operation is virtually emission-free, since organic solvents are present only in very small amounts, if at all, in the powder coating slurry of the invention.

For the powder coating slurry of the invention it is important that the homogenization proceeds to such an extent that not less than 30, preferably not less than 60, and in particular not less than 90% by weight of the polyisocyanate B are present in distribution, i.e., dissolved or dispersed, in the discrete binder particles A.

In accordance with the invention, the polyisocyanates B are present together with the binders A in the particles. For practical reasons, however, it is possible for less than 100% by weight of the polyisocyanates B to be present alongside the binders A in the particles. In this case the polyisocyanates B form particles which are present as a separate, discrete phase. It is important that not less than 30, preferably not less than 60 and in particular not less than 90% by weight of the polyisocyanates B are present in the particles in which the binders A are present. In other words, not more than 70, preferably not more than 40 and in particular not more than 10% of the polyisocyanates B should be present as separate discrete particles.

In accordance with the invention, it is of advantage if the binders A and crosslinking agents B are used in a proportion such that the molar ratio of hydroxyl groups to isocyanate groups is from 0.6:1 to 1:1.4, in particular from 0.8:1 to 1:1.2.

Furthermore, customary additives may be present, especially devolatilizers, leveling agents, light stabilizers such as UV absorbers and free-radical scavengers, defoamers, antioxidants, and stabilizers, the additives being present in either the particles and/or the aqueous phase. Moreover, at least one catalyst may be present for the reaction of the hydroxyl groups with the isocyanate groups.

In one preferred embodiment the binder A comprises:
a) 50–100% by weight, preferably 66–100% by weight, of a polyhydroxypolyacrylate,
b) 0–50% by weight, preferably from 0.1 to 34% by weight, of one or more non-a) binders from the group consisting of polyols, polyhydroxypolyurethanes, polyhydroxypolyesters, and polyepoxides. The polyhydroxypolyacrylate a) may be obtainable by reacting
  a1) from 7 to 60% by weight of hydroxyalkyl (meth) acrylates containing primary, secondary and/or tertiary OH groups,
  a2) 40–93% by weight of (cyclo)alkyl esters of (meth) acrylic acid having 1 to 18 carbon atoms in the (cyclo)alkyl radical,
  a3) 0–5% by weight of (meth)acrylic acid,
  a4) 0–30% by weight, preferably 0–10% by weight, of multiple (meth)acrylic esters of polyalcohols,
  a5) 0–40% by weight, preferably 0–35% by weight, of comonomers other than a1 to a4, the sum of the parts by weight of components a1 to a5 being 100%, and component a1 being selected with the proviso that at least 40% of the OH groups of the polyhydroxypolyacrylate a are attached to secondary or tertiary carbon atoms, and the polyhydroxypolyacrylate a having an OH number of from 30 to 200, preferably from 70 to 170, an acid number of from 0 to 50, preferably from 0 to 35, an average molar mass (number average determined by means of the GPC method against polystyrene standard) of from 1 500 to 30 000, preferably from 1 700 to 18 000, and a glass transition temperature of from 40 to 85° C., preferably from 45 to 75° C.

The crosslinking agent B preferably has an NCO content of from 5.0 to 30% by weight, preferably from 12 to 23% by weight, with an average NCO functionality of at least 2.1, preferably at least 2.4, and contains less than 1.5% by weight of monomeric diisocyanates having a molecular weight of below 300. The glass transition temperature is from 40 to 150° C., preferably from 50 to 135° C. (measured by means of differential thermoanalysis, DTA).

In one embodiment of the invention, one or more crosslinking agents other than the crosslinking agent B, from the group consisting of amino resins, carbamate resins, and blocked polyisocyanates, may be present in an amount of up to 60% by weight of the crosslinking agent B.

The deactivator used preferably comprises one or more substances from the group consisting of alcohols, OH-functional polyethers, monoamines, polyamines, OH-functional amines, NH-functional polyethers, OH— and NH-functional polyethers.

The invention embraces, finally, the use of the powder clearcoat slurry of the invention for producing a coated substrate, especially a motor vehicle body or a motor vehicle body part, where, following the application if desired of a primer and/or a primer-surfacer, a decorative topcoat material is applied to the substrate and subsequently, following preliminary drying, the powder clearcoat slurry is applied using customary spray application equipment and the topcoat and the powder clearcoat, following further preliminary drying if desired, are baked together.

Advantageously, at least 40, preferably at least 50, and with particular preference from 90 to 100% of the hydroxyl groups of the binder component A are hydroxyl groups attached to secondary and/or tertiary carbon atoms and the remainder, i.e., up to a maximum of 50%, preferably up to a maximum of 30%, and with particular preference up to a maximum of 10%, are alcoholic hydroxyl groups attached to primary carbon atoms.

Suitable binder components A are polyhydroxypolyacrylates, polyhydroxypolyurethanes or polyhydroxypolyesters.

The polyhydroxypolyurethanes are obtained by reacting urethane-group-free polyols (a) with diisocyanates (b) at an OH/NCO equivalents ratio of from 1.1:1 to 10:1, preferably from 1.2:1 to 2:1, with particular preference from 1.3:1 to 1.8:1, at temperatures of in general from 40 to 200° C., preferably from 60 to 160° C., with the proviso that the equivalents ratio of primary-attached OH groups in the initial polyols (a) to NCO groups of the diisocyanates (b) is $OH_{prim.}/NCO<1$.

Polyols (a) suitable for synthesizing the polyhydroxypolyurethanes are:
  (a1) aliphatic or cycloaliphatic polyhydric alcohols, with or without ether groups, of the molecular weight range from 62 to 400, preferably from 76 to 261;
  (a2) polyhydroxyl compounds containing ester groups and having an average molecular weight, calculable from functionality and OH number, of from 134 to 2,000, preferably from 176 to 1 500, and an average OH functionality of from 2.0 to 4.0; and if desired, but less preferably, (a3) further polyhydroxyl compounds containing ester groups and having an average molecular weight, calculable from functionality and OH number, of above 2,000 to 10,000, preferably up to 5,000, and OH numbers of between 20 and 200, preferably between 40 and 160.

In order to incorporate the secondary- and/or tertiary-attached OH groups, use is generally made of polyols of group (a1). Suitable examples are 1,2-propanediol, 1,2-, 1,3- and 2,3-butanediol, 3-methyl-1,3-butanediol, 2,5-hexanediol, 2-methyl-2,4-pentanediol, 1,2-octanediol, 2-ethyl-1,3-hexanediol, 2,5-dimethyl-2,5-hexanediol, 2,2,4-trimethyl-1,3-pentanediol, 1,2-hexadecanediol, 1,12-octadecanediol, 1,2- and 1,4-cyclohexanediol, 2,2,4,4-tetramethyl-1,3-cyclobutanediol, 2,2-bis(4-hydroxycyclohexyl)propane, glycerol, and 1,2,6-hexanetriol. As further polyols of group (a1) it is also possible, if desired, to use polyols containing exclusively primary-attached OH groups, but generally in minor portions if at all. Examples suitable for this purpose are 1,2-ethanediol, 1,3-propanediol, 1,4-butanediol, 1,6-hexanediol, diethylene glycol, triethylene glycol, dipropylene glycol, neopentyl glycol, cyclohexanedimethanol, 1,1,1-trimethylolethane, 1,1,1-trimethylpropane, pentaerythritol, and 1,3,5-tris(2-hydroxyethyl)isocyanurate.

The polyhydroxyl compounds (a2) containing ester groups that are used to prepare the polyhydroxypolyurethanes comprise conventional ester alcohols or ester alcohol mixtures as may be prepared, for example, by reacting polyhydric alcohols with substoichiometric amounts of polybasic carboxylic acids, corresponding carboxylic anhydrides, corresponding polycarboxylic esters of lower alcohols, or by reacting polyhydric alcohols with lactones. Polyhydric alcohols suitable for preparing the ester alcohols (a2) are, in particular, those with the molecular weight range from 62 to 400, as exemplified under point (a1), subject to restrictions in terms of primary-, secondary- or tertiary-attached OH groups such that the polyhydroxypolyurethanes ultimately obtained contain the requisite amount of secondary- and/or tertiary-attached hydroxyl groups. The acids or acid derivatives used to prepare the ester alcohols may be aliphatic, cycloaliphatic, aromatic and/or heteroaromatic in nature and may if desired be substituted, by halogen atoms, for example, and/or unsaturated. Examples of suitable acids are, for example, polybasic carboxylic acids of the molecular weight range from 118 to 300 or derivatives thereof such as, for example, succinic acid, adipic acid, sebacic acid, phthalic acid, isophthalic acid, trimellitic acid, phthalic anhydride, tetrahydrophthalic acid, maleic acid, maleic anhydride, dimeric and trimeric fatty acids, dimethyl terephthalate, and bisglycol terephthalate. To prepare the ester alcohols it is also possible to use any desired mixtures of the starting compounds exemplified. Their preparation is described, for example, in Houben-Weyl, MV/2, pp. 1–46. Preferably, however, the compounds used as starting component (a2) to prepare the polyhydroxypolyurethanes include ester polyols, as preparable in a manner known per se from lactones and simple polyhydric alcohols as starter molecules, with ring opening, subject to the proviso that sufficient amounts of synthesis components containing secondary- and/or tertiary-attached hydroxyl groups are used in order to meet the conditions in this respect that are important for the invention. Examples of suitable lactones for preparing these ester polyols are β-propiolactone, γ-butyrolactone, δ-valerolactone, and δ-caprolactone, 3,5,5- and 3,3,5-triethylcaprolactone, or any desired mixtures of such lactones. Examples of starter molecules used are the above-exemplified polyhydric alcohols (a1) of the molecular weight range from 62 to 400, or any desired mixtures of these alcohols. The preferred ester polyols are generally prepared in the presence of catalysts such as, for example, Lewis or Brönsted acids, organotin or organotitanium compounds, at temperatures from 20 to 200° C., preferably from 50 to 160° C.

The polyhydroxyl compounds (a3) containing ester groups that may also be used if desired to prepare the polyhydroxypolyurethanes and are from a higher molar weight range are prepared, as described under (a2), from— in principle—the same specified starting compounds.

Preferred components (a1) are 1,2-propanediol, 2-methyl-2,4-pentanediol, 2-ethyl-1,3-hexanediol, and 2,2,4-trimethyl-1,3-pentanediol. Preferred components (a2) are those based on 1,6-hexanediol, 1,1,1-trimethylolpropane, and δ-caprolactone, isophthalic acid, phthalic anhydride, tetrahydrophthalic acid, maleic anhydride and adipic acid. Components (a3) are used only in minor amounts if at all.

Diisocyanates (b) suitable for the synthesis of the polyhydroxypolyurethanes are in principle those of the molecular weight range from 140 to 300 containing isocyanate groups attached to (cyclo)aliphatic moieties, such as, for example, 1,4-diisocyanatobutane, 1,6-diisocyanatohexane (HDI), 2-methyl-1,5-diisocyanatopentane, 2,2-dimethyl-1,5-diisocyanatopentane, 2,2,4- and/or 2,4,4-trimethyl-1,6-diisocyanatohexane, 1,10-diisocyanatodecane, 1,3- and 1,4-diisocyanatocyclohexane, 2- and/or 4-methyl-1,3-diisocyanatocyclohexane, 1,3- and/or 1,4-bis(2-isocyanatoprop-2-yl)benzene, 1-isocyanato-3,3,3,5-trimethyl-5-isocyanatomethylcyclohexane (IPDI), and 4,4'-diisocyanatodicyclohexylmethane (HMDI). Diisocyanates (b) used with preference are HDI, IPDI and HMDI, the last-mentioned being very particularly preferred.

To prepare the polyhydroxypolyurethanes it is possible to react any desired mixtures of polyols (a) with any desired mixtures of diisocyanates (b). In general, the polyols (a) are used as mixtures, selected from the group of the polyols (a1) and the polyols (a2) containing ester groups, and also (a3) if desired, the composition being chosen such that the above-mentioned conditions of the OH/NCO ratio and the $OH_{prim.}$/NCO ratio are observed.

Mixtures of polyols (a) suitable for preparing the polyhydroxypolyurethanes also result, for example, when the polyhydric alcohols (a1) of the type exemplified used as starting material are converted only in part into ester alcohols (a2) using substoichiometric amounts of acids and/or acid derivatives of the type exemplified.

In addition to the abovementioned restrictions, the starting materials (a) and (b) are selected in such a way, furthermore, that polyhydroxypolyurethanes in the context of the OH number range specified above for the polyol components a2) are formed as resins which are solid at room temperature and have the specified glass transition temperatures, $T_g$, of from 30 to 120, preferably from 40 to 100° C.

The polyhydroxypolyurethanes suitable in accordance with the invention may be prepared in one or more stages. For instance, the totality of the polyols (a) used may be introduced as an initial charge and reacted with the diisocyanates (b). Alternatively, the diisocyanates (b) may be reacted with, for example, a portion of the polyols (a1) under mild reaction conditions to give preadducts containing secondary/tertiary OH and NCO groups and then, for example, the polyols (a2) containing primary OH groups may be incorporated by reaction. In a further embodiment, it is also possible to react polyols (a1) and/or (a2) containing primary OH groups with excess diisocyanate (b) to give NCO-terminal prepolymers and subsequently, by reaction with polyols (a1) and/or, if desired, (a2), to introduce the secondary and/or tertiary OH groups. The reaction temperature required for urethane formation is from 20 to 200° C., preferably from 40 to 160° C., with particular preference from 40 to 120° C. The reaction is preferably conducted without solvents. In order to accelerate the urethanization reaction it is possible to use the customary catalysts known from polyurethane chemistry, examples being tertiary amines, such as triethylamine, pyridine, methylpyridine, benzyldimethylamine, N,N-endoethylenepiperazine, N-methylpiperidine, pentamethyldiethylenetriamine, N,N-dimethylaminocyclohexane, N,N'-dimethylpiperazine, or metal salts such as iron(II) chloride, zinc chloride, zinc 2-ethylcaproate, tin(II) 2-ethylcaproate, dibutyltin(IV) dilaurate, and molybdenum glycolate. These catalysts are employed, if desired, in amounts from 0.001 to 2.0% by weight, preferably from 0.01 to 0.5% by weight, based on the total amount of the starting compounds used. Although it is preferred to prepare the polyhydroxypolyurethanes without solvents in the melt, the use of inert solvents may be indicated in some cases. In these cases, a suitable evaporation process is added subsequently in order to free the resulting compounds from the solvent and to isolate the solid resins. Suitable evaporation processes are, for example, those as indicated below in connection with the preparation of suitable polyhydroxypolyacrylates.

In terms of the manner of attachment of the hydroxyl groups, their OH number and their glass transition temperature, the polyhydroxypolyacrylates for use as possible binder components A correspond to the conditions stated above in general for the component A. Such polyhydroxypolyacrylates are obtainable in a variety of ways:

1. Using hydroxypropyl (meth)acrylate (isomer mixture formed in the addition reaction of propylene oxide with (meth)acrylic acid, containing about 75 secondary-attached and about 25 primary-attached OH groups) as hydroxy-functional comonomers in the preparation of polyacrylates.

For the preparation of polyacrylates of this kind, it is common to use three kinds of monomers, namely (i) from 7 to 60 parts by weight of hydroxypropyl (meth)acrylate, (ii) from 93 to 40 parts by weight of nonfunctional, olefinically unsaturated compounds, and (iii) from 0 to 5 parts by weight of carboxy-functional olefinically unsaturated compounds, the sum of the parts by weight of components (i) to (iii) being 100. The monomers (ii) comprise, for example, aromatics such as styrene, vinyltoluene, α-methylstyrene, and α-ethylstyrene, for example; (cyclo)alkyl esters of acrylic acid or methacrylic acid having 2 to 18 carbon atoms in the (cyclo)alkyl radical, such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, 2-ethylhexyl (meth)acrylate, cyclohexyl (meth)acrylate, neopentyl (meth)acrylate, isobornyl methacrylate, benzyl methacrylate, phenylethyl methacrylate, 3,3,5-trimethylcyclohexyl methacrylate, and stearyl acrylate, for example; dialkyl esters of maleic and/or fumaric acid having 1 to 12 carbon atoms in the alkyl radical, such as dimethyl maleate, diethyl maleate, di-n-propyl maleate, diisopropyl maleate, di-n-butyl maleate, diisobutyl maleate, di-tert-butyl maleate, di-2-ethylhexyl maleate, dicyclohexyl maleate, and the corresponding fumaric esters, for example. The monomers (iii) comprise, for example, acrylic acid, methacrylic acid, and monoesters of maleic and/or fumaric acid having 1 to 12 carbon atoms in the alcohol residue. Correspondingly suitable alkyl radicals are, for example, those stated in connection with the dialkyl esters of the maleic and/or fumaric acid of the monomers (ii).

For the preparation of polyacrylate polyols it is possible, within the proportion limits indicated above, to use in each case any desired mixtures of the monomers (i) to (iii), with the proviso that in the context of the preparation of the copolymers this selection is made in such a way that the resulting copolymers have hydroxyl numbers and glass transition temperatures within the abovementioned ranges. This condition, which is advantageous for the inventive usefulness of the copolymers, is met when an appropriate ratio of "softening" monomers, which lead to a reduction in the glass transition temperature of the copolymers, to "hardening" monomers, which lead to an increase in the glass transition temperature, is employed for the preparation of the copolymers. Examples of "softening" monomers are alkyl esters of acrylic acid, such as ethyl acrylate, n-butyl acrylate, isobutyl acrylate, and 2-ethylhexyl acrylate, for example. Examples of "hardening" monomers are alkyl esters of methacrylic acid, such as methyl methacrylate, ethyl methacrylate, isobutyl methacrylate, cyclohexyl methacrylate, isopropyl methacrylate, tert-butyl methacrylate, neopentyl methacrylate, isobornyl methacrylate, and 3,3,5-trimethylcyclohexyl methacrylate, for example, and vinylaromatics, such as styrene, vinyltoluene, and α-ethylstyrene, for example.

The polyhydroxypolyacrylates are prepared by free-radically initiated copolymerization of the abovementioned monomers in appropriate organic solvents. The monomers are copolymerized at temperatures from 60 to 180° C., preferably from 80 to 160° C., in the presence of free-radical initiators, and, if desired, of molecular weight regulators. The solvents have a boiling point or boiling range at 1 013 mbar that is within the temperature range from 50 to 150, preferably from 75 to 130° C. Examples of solvents suitable for preparing the copolymers are aromatics, such as toluene or xylene; esters, such as methyl acetate, ethyl acetate, isopropyl acetate, n-propyl acetate, isopropyl acetate, n-butyl acetate or methyl-n-amyl acetate; ketones, such as 2-propanone, 2-butanone, 2-pentanone, 3-pentanone, 3-methyl-2-butanone, 4-methyl-2-pentanone, 5-methyl-2-hexanone or 2-heptanone; alcohols such as n-butanol, n-pentanol or hexanols; ethers such as butyl glycol dimethyl ether or propylene glycol dimethyl ether, or any desired mixtures of such solvents. The polyhydroxypolyacrylates may be prepared continuously or batchwise. Normally, the monomer mixture and the initiator are metered continuously and at a uniform rate into a polymerization reactor and at the same time the corresponding amount of polymer is taken off continuously. In this way it is possible to prepare copolymers which are virtually uniform chemically. Copolymers virtually uniform chemically may also be prepared by running the reaction mixture at constant rate into a stirred tank without taking off the polymer. It is also possible, for example, to include a portion of the monomers in solvents of the stated type in the initial charge and to introduce the remaining monomers and auxiliaries, separately or together, into this initial charge at the reaction temperature. In general, the polymerization takes place under atmospheric pressure, but may also be conducted at pressures of up to 25 bar. The initiators are used in amounts of from 0.05 to 15% by weight, based on the total amount of the monomers. Suitable initiators are customary free-radical initiators, such as aliphatic azo compounds, for example, such as azodiisobutyronitrile, azobis-2-methylvaleronitrile, 1,1-azobis-1-cyclohexanenitrile and alkyl 2,2'-azobisisobutyrate, symmetrical diacyl peroxides such as acetyl, propionyl or butyryl peroxide, for example, bromo-, nitro- or methoxy-substituted benzoyl peroxides, lauryl peroxides; symmetrical peroxydicarbonates, e.g., diethyl, diisopropyl, dicyclohexyl, and dibenzoyl peroxydicarbonate; tert-butyl peroxy-2-ethylhexanoate, tert-butyl perbenzoate; hydroperoxides, such as tert-butyl hydroperoxide, cumene hydroperoxide, for example, dialkyl peroxides, such as dicumyl peroxide; tert-butyl cumyl peroxide or di-tert-butyl peroxide. To regulate the molecular weight of the copolymers it is possible to use customary regulators during the preparation. By way of example there may be mentioned tert-dodecyl mercaptan, n-dodecyl mercaptan or diisopropylxanthogen disulfide. The regulators may be added in amounts of from 0.1 to 10% by weight, based on the total amount of the monomer. To isolate the solvent-free polyhydroxypolyacrylates, the solutions obtained are subjected to a solvent removal process, in which substantially all of the solvent is removed. An example of such a solvent removal process may be as follows: spray drying, degassing in specific or commercially customary evaporation extruders or coiled-tube evaporators, distillation under vacuum, including high vacuum. The polyhydroxypolyacrylates may alternatively be prepared in bulk, in the absence of solvents of the stated kind, and discharged as a hot melt and processed further. In the case of a process of this kind, a portion of the monomers, preferably dialkyl maleates, is included in the initial charge and the remaining monomers and the initiator, separately or together, are introduced into this initial charge at the reaction temperature, which is preferably in the range from 140 to 180° C. The finished polymer is discharged as a melt from the reactor, cooled, and subsequently granulated.

2. Reacting suitable carboxyl-functional polyacrylates with appropriately substituted monoepoxides such as isobutylene oxide (2-methyl-1,2-epoxypropane), isoamylene oxide (2-methyl-2,3-epoxybutane), neohexene oxide (3,3-dimethyl-1,2-epoxybutane), cis- and/or trans-2,3-butylene oxide, and cyclohexene oxide (1,2-epoxycyclohexane), for example. The reaction of such epoxides with carboxyl-functional polyacrylates takes place generally at temperatures from 80 to 200° C., preferably from 100 to 180° C., with the assistance of catalysts. Judiciously, the reaction is conducted in pressure reactors under pressures of up to 20 bar, owing to the low boiling points of the epoxides. Suitable catalysts are, for example, salts of tertiary ammonium compounds such as tetrabutylammonium chloride or tetrabutylammonium bromide, for example.

The required carboxyl-functional polyacrylates are prepared in the same way as the abovementioned hydroxyl-functional polyacrylates, with the difference that no OH-functional monomers are employed. The carboxyl-functional monomers used are preferably acrylic acid or methacrylic acid, although monoesters of maleic acid and fumaric acid may also be employed. One particular variant of the preparation of carboxyl-functional polyacrylates starts from polyacrylates containing cyclic anhydride groups, prepared using maleic anhydride, which in a second reaction step are reacted with monofunctional alcohols having 1 to 17 carbon atoms, optionally in the presence of—for example—amine catalysts, to give the corresponding monoester.

The further, nonfunctional comonomers, to be used in addition to carboxyl- and/or anhydride-functional monomers, comprise in principle the same representatives already exemplified in connection with the afore-described hydroxyl-functional polyacrylates.

3. Reacting suitable epoxy-functional polyacrylates with monocarboxylic acids such as acetic acid, propionic acid, butyric acid, isobutyric acid, valeric acid, isovaleric acid, ethylmethylacetic acid, trimethylacetic acid, and 2-ethylhexanoic acid, for example. In principle, longer-chain carboxylic acids having up to 17 carbon atoms are also suitable, but in that case the epoxy-functional polyacrylates for reaction must have appropriately high glass transition temperatures so that the reaction with monocarboxylic acids results in polyhydroxypolyacrylates having glass transition temperatures which are situated within the desired range of from 30 to 120° C.

4. Reacting suitable hydroxy-functional polyacrylates with diisocyanates and correspondingly substituted aliphatic and/or cycloaliphatic diols. Examples of suitable hydroxy-functional polyacrylates are those already mentioned above under 1. and, furthermore, those also having primary hydroxyl groups instead of secondary ones. Preference is given here to polyacrylates containing primary hydroxyl groups, preparable, for example, by using hydroxyethyl (meth)acrylate as OH monomer. Suitable comonomers have already been mentioned above under 1. Diisocyanates suitable for the reaction are the compounds mentioned in connection with the preparation of the polyhydroxypolyurethanes under (b); suitable aliphatic and/or cycloaliphatic diols containing secondary- and/or tertiary-attached OH groups are the compounds listed there in the first exemplary group under (a1). In the case of the inventively suitable polyhydroxypolyacrylates obtainable in this way, the preparation process corresponds to the process described in connection with the preparation of the polyhydroxypolyurethanes.

It is also possible to use the binder components A described below. As binder component A the powder coating slurries of the invention may comprise at least A1) a hydroxyl-containing acrylic copolymer (A1) having a glass transition temperature of from 40 to 85° C., preferably from 45 to 75° C. (measured in each case by means of differential scanning calorimetry (DSC)), a number-average molecular weight of from 1 500 to 30 000 daltons, preferably from 2 500 to 10 000 (determined in each case by gel permeation chromatography using a polystyrene standard), and an OH number of from 60 to 130 mg KOH/g, preferably from 100 to 170 mg KOH/g, up to 60%, preferably up to 50%, of the hydroxyl groups of the binder (A1) consisting of primary-attached OH groups, and/or A2) the reaction product of a carboxyl-containing acrylic copolymer and an epoxy-functional compound or the reaction product of an epoxy-functional acrylic copolymer and a carboxyl-containing compound, the carboxy/epoxy reaction taking place in each case before or during the reaction of the binder A with the crosslinking agent B.

Examples of suitable binders A are hydroxyl-containing polyacrylate resins (A1) preparable by copolymerizing at least one ethylenically unsaturated monomer containing at least one hydroxyl group in the molecule with at least one further ethylenically unsaturated monomer containing no hydroxyl group in the molecule, at least one of the monomers being an ester of acrylic acid or methacrylic acid. Suitable hydroxyl-containing polyacrylate resins (A1) are also known, for example, from DE-A-43 37 430, DE-A-41 13 052, and EP-A-591 362.

Examples of hydroxyl-containing monomers are hydroxyethyl (meth)acrylate, hydroxypropyl (meth)acrylate, hydroxybutyl (meth)acrylate, and hydroxymethylcyclohexenyl (meth)acrylate, preference being given to the use of hydroxyethyl methacrylate, alone or together with other hydroxyl-containing monomers. Examples of ethylenically unsaturated monomers which contain no hydroxyl group in the molecule are alkyl esters of acrylic acid and methacrylic acid containing 1 to 20 carbon atoms in the alkyl radical, especially methyl acrylate, methyl methacrylate, ethyl acrylate, ethyl methacrylate, butyl acrylate, butyl methacrylate, 2-ethylhexyl acrylate, and 2-ethylhexyl methacrylate. Further examples of ethylenically unsaturated monomers which contain no hydroxyl groups in the molecule are acid amides, such as acrylamide and methacrylamide, for example, vinylaromatic compounds, such as styrene, methylstyrene, and vinyltoluene, nitriles, such as acrylonitrile and methacrylonitrile, vinyl and vinylidene halides, such as vinyl chloride and vinylidene fluoride, vinyl esters, such as vinyl acetate, for example, and carboxyl-containing monomers such as acrylic acid and methacrylic acid, for example.

Furthermore, the powder coating slurry of the invention may also comprise as binder A, or as a further binder, the reaction product of a carboxyl-containing acrylic copolymer and an epoxy-functional compound or the reaction product of an epoxy-functional acrylic copolymer and a carboxyl-containing compound. The carboxy/epoxy reaction may take place prior to mixing with the isocyanato-containing crosslinker, i.e., the reaction product is used as binder A. It is also possible, however, to use a mixture of the epoxy-functional component and the carboxyl-containing component in the powder coating slurry of the invention. In this case the carboxy/epoxy reaction does not take place until during the curing of the powder coating material, in which case the hydroxyl groups formed in the carboxy/epoxy reaction react in situ with the isocyanate crosslinker.

Examples of suitable expoxy-functional polyacrylate resins for use in the powder coating slurry of the invention as binder component A are those preparable by copolymerizing at least one ethylenically unsaturated monomer containing at least one epoxide group in the molecule with at least one further ethylenically unsaturated monomer containing no epoxide group in the molecule, at least one of the monomers being an ester of acrylic acid or methacrylic acid. Epoxy-functional polyacrylate resins of this kind are known, for example, from EP-A-299 420, DE-B-22 14 650, DE-B-27 49 576, U.S. Pat. No. 4,091,048, and U.S. Pat. No. 3,781, 379. Examples of ethylenically unsaturated monomers which contain no epoxide group in the molecule are the compounds already mentioned in connection with the description of the hydroxyl-containing acrylic copolymers. The epoxy-functional polyacrylate resin normally has an epoxide equivalent weight of from 300 to 2 500, preferably from 350 to 700, a number-average molecular weight (determined by gel permeation chromatography using a polystyrene standard) of from 1 700 to 20 000, preferably from 2 000 to 10 000, and a glass transition temperature ($T_g$) of from 30 to 80, preferably from 40 to 70, with particular preference from 40 to 60° C. (measured by means of differential scanning calorimetry (DSC)). Very particular preference is given to approximately 50° C. Mixtures of two or more acrylate resins may also be employed. Suitable for the reaction with the epoxy-functional acrylic copolymers are, for example, carboxylic acids, especially saturated, straight-chain, aliphatic dicarboxylic acids having 3 to 20 carbon atoms in the molecule. Very particular preference is given to using a dicarboxylic acid having 12 carbon atoms in the molecule, such as dodecane-1,12-dicarboxylic acid, for example. In order to modify the properties of the finished powder coating slurries it is possible if desired to use other carboxyl-containing compounds as well. Examples thereof that may be mentioned include saturated branched or unsaturated straight-chain dicarboxylic and polycarboxylic acids and also polymers containing carboxyl groups.

Also suitable, furthermore, as binder component A for the preparation of the powder coating materials of the invention are carboxyl-containing polyacrylate resins preparable by copolymerizing at least one ethylenically unsaturated monomer containing at least one acid group in the molecule with at least one further ethylenically unsaturated monomer containing no acid group in the molecule. Preference is given to using carboxyl-containing acrylic copolymers having a glass transition temperature of from 30 to 80° C., preferably from 40 to 60° C. (measured in each case by means of differential scanning calorimetry (DSC)), a number-average molecular weight of from 1 700 to 20 000 daltons, preferably from 2 000 to 10 000 (determined in each case by gel permeation chromatography using a polystyrene standard), and an acid number of from 60 to 180 mg KOH/g, preferably from 100 to 170 mg KOH/g.

The epoxy-functional compound and the carboxyl-containing compound are usually used in amounts such that there are from 0.5 to 1.5, preferably from 0.5 to 1.25, equivalents of carboxyl groups per equivalent of epoxide groups. The amount of carboxyl groups present may be determined by titrating with an alcoholic KOH solution.

In the powder coating slurry of the invention it is preferred as binder A to use hydroxyl- and/or carboxyl- and/or epoxy-functional acrylic copolymers having a vinylaromatic compound content of less than 50% by weight, with particular preference of less than 30% by weight, with very particular preference from 10 to 25% by weight, based in each case on the total weight of the monomers used.

The aforementioned hydroxyl- and/or epoxy- and/or carboxyl-functional polyacrylate resins may be prepared by polymerization in accordance with methods which are widely and well known. It is of course also possible to use any desired mixtures of the binders A mentioned.

In the powder coating slurry of the invention it is possible if desired, together with the acrylate-based, hydroxyl-containing binders A, to use hydroxyl-containing polyester resins prepared in a customary manner from aromatic or aliphatic or cycloaliphatic diols and/or polyols, alone or in combination with monools, and aromatic or aliphatic or cylocaliphatic dicarboxylic and/or polycarboxylic acids, alone or in combination with monocarboxylic acids. Owing to the better chalking resistance and weathering stability it is preferred to use aliphatic and/or cycloaliphatic synthesis components for the preparation of the polyester resins. For example, the polyester resins may have been prepared using ethylene glycol, propanediol, butanediol, neopentyl glycol, hexanediol, cyclohexanediol, 4,4'-dihydroxy-2,2-dicyclohexylpropane, trimethylolpropane, hexanetriol, pentaerythritol. Further suitable diols include esters of hydroxycarboxylic acids with diols, it being possible to use as diol the aforementioned diols. Examples of hydroxycarboxylic acids are hydroxypivalic acid and dimethylolpropanoic acid. As acids it is possible, for example, to use adipic acid, glutaric acid, azelaic acid, sebacic acid, fumaric acid, maleic acid, tetrahydrophthalic acid, hexahydrophthalic acid, cyclohexanedicarboxylic acid, phthalic acid, terephthalic acid, isophthalic acid and trimellitic acid. Also suitable are the esterifiable derivatives of the abovementioned polycarboxylic acids, such as, for example, their monoesters or polyesters with aliphatic alcohols having 1 to 4 carbon atoms or hydroxy alcohols having 1 to 4 carbon atoms. It is also possible, furthermore, to use the anhydrides of the abovementioned acids, where they exist. Suitable hydroxyl-containing polyester resins are also known, for example, from DE-A-25 47 124 and EP-A-0 408 465.

With regard to the nature of their hydroxyl groups, their OH number and their glass transition temperature, the polyhydroxypolyesters which can be used per se as binder component A correspond to the conditions already indicated above in general for component A. Their average molecular weight (i.e., that calculable from OH content and OH functionality) is generally from 400 to 10 000, preferably from 1 000 to 5 000. Such polyhydroxypolyesters are obtainable in a variety of ways: esterification of acids or acid derivatives of the type already exemplified above with excess amounts of diols and/or triols containing secondary- and/or tertiary-attached alcoholic hydroxyl groups of the type already exemplified above under (a1), or reaction of suitable carboxyl-functional polyesters with appropriately substituted monoepoxides. In this case it is possible to use the carboxyl-containing polyesters known for powder coating materials and to react them, as described above in connection with the preparation of the polyhydroxypoly-acrylates under point 2, with appropriate monoepoxides as exemplified there.

The crosslinking component B comprises conventional, low-monomer paint polyisocyanates containing from 5 to 30% by weight, preferably from 12 to 23% by weight, of free isocyanate groups attached to primary or secondary aliphatic carbon atoms, having an average NCO functionality of at least 2.1, preferably at least 2.4, and with particular preference at least 3.0, and containing not more than 0.5, preferably not more than 0.3% by weight of monomeric diisocyanates having a molecular weight of below 300. The crosslinking component B preferably has a melting point or melting range which is situated between 30° C. and 120° C., although this is not a mandatory condition, since all that is important is that the component B is preferably solid below 30° C. and liquid above 120° C.

The crosslinking component B preferably comprises conventional paint polyisocyanates which meet these conditions and contain urethane groups and, in particular, isocyanurate groups. Suitable polyisocyanates containing isocyanurate groups may be prepared as described in EP-A-0 003 765, EP-A-0 010 589, EP-A-0 017 998, EP-A-0 047 452, EP-A-0 187 105, EP-A-0 978 614, or EP-A-0 330 966. Polyisocyanates modified with urethane groups, for example, are obtained by reacting aliphatic diisocyanates with any desired, polyfunctional aliphatic or cycloaliphatic polyhydric alcohols, optionally containing ether groups or ester groups, of the molecular weight range from 62 to 1 000, while maintaining an NCO/OH equivalents ratio of >2, preferably from 3:1 to 15:1, in particular from 3:1 to 7:1, at temperatures of in general from 60 to 120° C. The excess monomeric diisocyanate may be removed by distillation or extraction, in which context the monomeric starting diisocyanate is preferably separated off by means of a thin-film distillation apparatus within the temperature range from 140 to 200° C. at a pressure of between 0.1 and 0.5 mbar, so as to give 100% solids polyisocyanates having the stated maximum monomer content of <0.5% by weight, preferably <0.3% by weight.

Likewise suitable in accordance with the invention as crosslinking component B are paint polyisocyanates which meet the above conditions and which contain both urethane groups and isocyanurate groups. Likewise suitable are those paint polyisocyanates meeting the abovementioned conditions that contain both allophanate and isocyanurate groups, as may be obtained, for example, in accordance with German patent application P 43 35 796.2. Expressed in general terms, the crosslinking component B may be obtained by oligomerization from the aliphatic and cylocaliphatic diisocyanates exemplified below, and/or mixtures thereof, specifically by preparing isocyanurates, biurets, allophanates with monoalcohols and polyalcohols, carbodiimides or urethanes of polyalcohols. It is also possible to use mixtures of such oligomers.

Starting diisocyanates for preparing the crosslinking component B are aliphatic diisocyanates of the molecular weight range from 140 to 300, preference being given to 1-isocyanato-3,3,5-trimethyl-5-isocyanatomethylcyclohexane (IPDI), 4,4'-diisocyanatodicyclohexylmethane (HMDI) and mixtures thereof with 1,6-diisocyanatohexane (HDI). Also suitable, furthermore, is m-TMXDI (1,3-bis(2-isocyanatoprop-2-yl)benzene). The stated starting diisocyanates used to prepare the paint polyisocyanates may, if appropriate, represent mixtures and may consist with particular preference of from 70 to 100% by weight IPDI and/or HMDI and from 0 to 30% by weight HDI. Appropriately composed blends of IPDI and HMDI homotrimers with HDI homotrimers are also suitable as component B.

For the deactivation it is common to react up to 30, preferably up to 20, and in particular up to 10 mol % of the total isocyanate groups present with the deactivator. The key factor is to react a sufficient quantity that a watertight encapsulation is produced. For each specific case, therefore, it is easy for the skilled worker to determine the lower value on the basis of simple preliminary experiments.

For the present invention it is very important that the reaction is conducted in water.

Examples of suitable deactivators are the following: water, primary and secondary mono-, di- and polyamines, hydrazine derivatives, amidines, guanidines, mono- and polyalcohols, and compounds containing carboxyl groups, phenolic hydroxyl groups, amide groups or hydrazide groups. Examples of suitable deactivators are also the deactivators specified in EP-B-100508 in column 6, lines 10 to 37 and column 6, line 53 to column 7, line 19, and EP-B-100507 column 5, lines 20 to 58, and also the compounds specified in EP-A-431 413, DE-A-35 17 333, DE-A-32 30 757, DE-A-35 29 530, DE-A-34 03 500 and EP-A-153 579. For further details of deactivation, reference is made, for example, to EP-A-62 780 pages 6 and 7, EP-B-100508 columns 6 and 7, and EP-B-100517 column 5. Also of particular suitability are deactivators as specified in the literature reference U.S. Pat. No. 4,888,124, column 5, line 60 to column 7, line 53, to which express reference is hereby made.

The function of the deactivator may also be taken on by specific additives or binder constituents, including in particular coatings auxiliaries added to the aqueous phase, such as stabilizers, emulsifiers or thickeners, provided these substances do not diffuse into the dispersion particles with the consequence of swelling and/or coagulation. A particularly stable dispersion is achieved, however, when at least a portion of the stabilizers and/or emulsifiers is replaced by stabilizers which react with the NCO groups present on the surface of the dispersion particles and, in so doing, perform a dual function, by acting additionally as deactivators. Preferably, the substances selected from the above group are those which not only react selectively with superficial NCO groups but also bring about stabilization of the dispersion in water, yet ensure that, following the application and the evaporation of the water, during the first baking or film-forming phase, the particles flow out effectively and produce smooth, homogeneous, clear films.

The catalysts which may be used if desired to accelerate the curing of the powder coating resins comprise, for example, the customary compounds known from polyurethane chemistry, as already exemplified above in connection with the process for preparing the polyhydroxypolyurethanes, for the catalysis of the urethanization reaction. If catalysts are employed, then preference is given within this group to zinc salts, tin(II) salts or tin(IV) salts. Further representatives of suitable catalysts, and details about the mode of action of such catalysts, are described in Kunststoff-Handbuch, volume VII, edited by Vieweg and Höchtlen, Carl-Hanser-Verlag, Munich 1966, on pages 96 to 102, for example. The catalysts may be added if desired in amounts of from 0.01 to 5.0% by weight, preferably from 0.05 to 1.0% by weight, based on the total amount of organic binder, i.e., the combination of components A and B, but excluding any further auxiliaries and additives which may be used.

Furthermore, the solid components A and/or B may comprise auxiliaries and additives of the type defined in general above. An example of a devolatalizer is benzoin. Suitable leveling agents include substances based on polyacrylates, polysiloxanes, and/or fluorine compounds. Antioxidants which can be used are reducing agents such as hydrazides and phosphorus compounds and also free-radical scavengers, e.g., 2,6-di-tert-butylphenol. UV absorbers which can be used are preferably triazines and benzotriphenol. As free-radical scavengers it is possible to use 2,2,6,6-tetra-methylpiperidine derivatives.

The aqueous phase for the powder coating slurry may comprise at least one nonionic thickener. It is preferred to use nonionic associative thickeners. Structural features of such associative thickeners are:

aa) a hydrophilic framework which ensures sufficient solubility in water, and ab) hydrophobic groups capable of associative interaction in the aqueous medium.

Hydrophobic groups used are, for example, long-chain alkyl radicals, such as dodecyl, hexadecyl or octadecyl radicals, for example, or alkaryl radicals, such as octylphenyl or nonylphenyl radicals, for example. Hydrophilic frameworks used are preferably polyacrylates, cellulose ethers or, with particular preference, polyurethanes, containing the hydrophobic groups as polymer building blocks. As hydrophilic structures, very particular preference is given to polyurethanes containing polyether chains as building blocks, preferably comprising polyethylene oxide. In the synthesis of such polyetherpolyurethanes the diisocyanates and/or polyisocyanates, preferably aliphatic diisocyanates, with particular preference unsubstituted or alkyl-substituted 1,6-hexamethylene diisocyanate, are used to link the hydroxyl-terminated polyether building blocks to one another and to link the polyether building blocks to the hydrophobic endgroup building blocks, which may, for example, be monofunctional alcohols and/or amines having the abovementioned long-chain alkyl radicals or aralkyl radicals. Furthermore, the aqueous phase may comprise catalysts, leveling agents, antioxidants, UV absorbers, free-radical scavengers, and wetting agents. Suitable substances in this context are substantially the substances already listed for components A and/or B. Furthermore, auxiliaries, defoamers, dispersing aids, biocides, solvents, and neutralizing agents may be added to the aqueous phase. Suitable defoamers are preferably modified polysiloxanes. Examples of dispersing aids are preferably ammonium and/or metal salts of polycarboxylates. Neutralizing agents which can be used are amines and metal hydroxides.

So that the application properties and film properties of the powder coating slurry do not alter even following prolonged storage of the material, the binder A and also the crosslinking agent B must react at room temperature neither with one another nor with the added additives nor yet with the water that acts as solvent.

The powder coating slurry of the invention can be prepared by a variety of processes customary in powder coating slurry technology.

In accordance with the process of the invention, however, the binder component A and the crosslinking component B, following their synthesis, are discharged as solids and then homogenized in the melted state, in a customary and known manner, using kneading apparatus or extruders, in the course of which they are freed, if appropriate, from organic solvents, using reduced pressure.

For the process of the invention it is very important here that the homogenization proceeds to such an extent that not less than 30, preferably not less than 60, and in particular not less than 90% by weight of the polyisocyanate B are present in solution or dispersion in the particles comprising the binders A.

In accordance with the invention, the polyisocyanates B are present and the binders in the particles. For practical reasons, however, it is possible for less than 100% by weight of the polyisocyanates B to be present and the particles. In that case they form particles which are present as a separate, discrete phase. It is important that not less than 30, preferably not less than 90% by weight of the polyisocyanates B are present in the particles which contain the binders A.

Following homogenization, the particles are ground to an average particle size of from 80 to 100 µm by means of customary methods. Water (deionized) is then added to the resulting powder, accompanied by the addition of the deactivator and also, if desired, by the addition of further additives, the addition of water taking place in several steps if desired, and the resulting composition is ground by means of wet grinding (see, for example, the patent DE 19613547 A1) to an average particle size <10 µm. Alternatively, the water may comprise all or only a portion of the additives.

The powder coating slurry of the invention advantageously contains less than 1.5% of organic constituents which are volatile under crosslinking conditions. The non-volatile fractions lie judiciously in the range from 25 to 55% by weight, preferably from 30 to 45% by weight. For application, the powder slurry of the invention is adjusted with water and/or with thickener to the appropriate spray viscosity.

The powder coating slurry of the invention may be used as a pigmented coating material or in the form of a clearcoat material as a coating for decorative basecoats, preferably in the automobile industry. The powder coating slurries of the invention may be applied by the methods known from liquid coating technology. In particular, they may be applied by means of spraying techniques. Likewise suitable are electrostatically assisted high-speed rotation or pneumatic application. The powder clearcoat slurries applied to a (decorative) basecoat are generally flashed off prior to baking. This takes place judiciously first at room temperature and/or at slightly elevated temperature. In general the elevated temperature is from 40 to 70° C., preferably from 50 to 65° C. Flashing off is carried out for from 2 to 20 minutes, preferably from 4 to 8 minutes. It is also possible to carry out flashing off first at room temperature for the period of time specified and then at the stated elevated temperature. Flashing off in this case is repeated for the same period of time at the elevated temperature. Baking may be carried out at temperatures as low as 130° C. It is possible to carry out baking at from 130 to 180° C., preferably from 135 to 145° C., and over a period of from 10 to 50 minutes, preferably from 12 to 30 minutes. The powder coating slurry is preferably applied in an amount such that, after baking, the thickness of the resulting coat is from 30 to 50 µm, preferably from 35 to 45 µmm. These coat thicknesses are entirely sufficient to give a high-gloss clearcoat film. As far as the resistance is concerned, an MEK resistance of more than 100 double strokes, and good condensation resistance, are obtained.

What is claimed is:

1. A powder coating slurry comprising at least one hydroxyl-containing binder A, at least one polyisocyanate crosslinking agent B, and water, wherein
   1. the at least one hydroxyl-containing binder A and the at least one polyisocyanate B have been homogenized such that not less than 30% by weight of the at least one polyisocyanate B is present in solution or dispersion in the particles comprising the at least one hydroxyl-containing binder A, and
   2. the particles of the at least one crosslinking agent B, which may still be present in the aqueous phase, and the particles comprising the at least one hydroxyl-containing binder A and the at least one crosslinking agent B, are stabilized, by way of the isocyanate groups present on their surface, by means of a deactivator added to the aqueous phase wherein the at least one hydroxyl-containing binder A comprises a polyhydroxypolyacrylate, wherein at least 50% of the OH groups of the polyhydroxypolyacrylate are attached to secondary or tertiary carbon atoms.

2. The powder coating slurry as claimed in claim 1, wherein components A and B are used in a proportion with the proviso that OH groups and NCO groups are present in a molar ratio OH:NCO from 0.6:1 to 1:14.

3. The powder coating slurry as claimed in claim 1 further comprising customary coatings additives selected from the group consisting of devolatilizers, leveling agents, light stabilizers, defoamers, antioxidants, stabilizers and mixtures thereof.

4. The powder coating slurry as claimed in claim 1 further comprising at least one catalyst for the reaction of OH groups with NCO groups.

5. The powder coating slurry as claimed in claim 1, wherein the binder A comprises:
   i) 50–100% by weight of a polyhydroxypolyacrylate a,
   ii) 0–50% by weight, of one or more non-a binders selected from the group consisting of polyols, polyhydroxy-polyurethanes, polyhydroxypolyesters, and polyepoxides and mixtures thereof.

6. The powder coating slurry as claimed in claim 5, wherein the polyhydroxypolyacrylate a is obtained by reacting
   a1) from 7 to 60% by weight of hydroxyalkyl (meth) acrylates containing primary, secondary and/or tertiary OH groups,
   a2) 40–93% by weight of (cyclo)alkyl esters of (meth) acrylic acid having 1 to 18 carbon atoms in the (cyclo) alkyl radical,
   a3) 0–1.0% by weight of (meth)acrylic acid,
   a4) 0–30% by weight, preferably 0–10% by weight, of multiple (meth)acrylic esters of polyalcohols,
   a5) 0–40% by weight, preferably 0–35% by weight, of comonomers other than a1 to a4, the sum of the parts by weight of components a1 to a5 being 100%, and component a1 being selected with the proviso that at least 40% of the OH groups of the polyhydroxypolyacrylate a are attached to secondary or tertiary carbon atoms, and the polyhydroxypolyacrylate a having an OH number of from 30 to 200, an acid number of from 0 to 50, an average molar mass (number average determined by means of the GPC method against polystyrene standard) of from 1500 to 30,000, and a glass transition temperature of from 40 to 85° C.

7. The powder coating slurry as claimed in claim 1, wherein the crosslinking agent B has an NCO content of from 5.0 to 30% by weight, with an average NCO functionality of at least 2.1, and contains less than 1.5% by weight of monomeric diisocyanates having a molecular weight of less than 300, and wherein the crosslinking agent B has a glass transition temperature of from 40 to 150° C.

8. The powder coating slurry as claimed in claim 1 further comprising one or more crosslinking agents other than the crosslinking agent B and selected from the group consisting of amino resins, carbamate resins, and blocked polyisocyanates in an amount of up to 60% by weight of the crosslinking agent B.

9. The powder coating slurry as claimed in claim 1, wherein deactivators used comprise one or more substances from the group consisting of alcohols, OH-functional polyethers, monoamines, polyamines, OH-functional amines, NH-functional polyethers, and OH— and NH-functional polyethers.

10. A process for preparing the powder coating slurry as claimed in claim 1, comprising homogenizing the at least one hydroxyl-containing binder A and the at least one crosslinking agent B, grinding the resulting mixture, and wet-grinding the resulting powder to an average particle size below 10 µm, wherein
   1) the at least one hydroxyl-containing binder A and the at least one polyisocyanate B have been homogenized such that not less than 30% by weight of the at least one polyisocyanate B is present in solution or dispersion in the particles comprising the at least one hydroxyl-containing binder A, and
   2) The particles of the at least one crosslinking agent B, which may still be present in the aqueous phase, and the particles comprising the at least one hydroxyl-containing binder A and the at least one crosslinking agent B, have been stabilized, by way of the isocyanate groups present on their surface, by means of a deactivator added to the aqueous phase.

11. A coating composition according to claim 1 wherein the hydroxyl-containing binders A and the polyisocyanates B have been homogenized such that not less than 60% by weight of the polyisocyanate B are present in solution or dispersion in the particles comprising the binders A and the particles of the crosslinking agent B which may still be present in the aqueous phase.

12. A coating composition according to claim 1 wherein the hydroxyl-containing binders A and the polyisocyanates B have been homogenized such that not less than 90% by weight of the polyisocyanate B are present in solution or dispersion in the particles comprising the binders A, and the,particles of the crosslinking agent B which may still be present in the aqueous phase.

13. The powder coating slurry as claimed in claim 1, wherein components A and B are used in a proportion with the proviso that OH groups and NCO groups are present in a molar ratio OH:NCO from preferably from 0.8:1 to 1:1.2.

14. The coating composition of claim 1 wherein the binder A comprises:
  i) 66–100% by weight of a polyhydroxypolyacrylate a,
  ii) from 0.1 to 34% by weight, of one or more non-a binders selected from the group consisting of polyols, polyhydroxy- polyurethanes, polyhydroxypolyesters, and polyepoxides and mixtures thereof.

15. The powder coating slurry as claimed in claim 5, wherein the polyhydroxypolyacrylate a is obtained by reacting
  a1) from 7 to 60% by weight of hydroxyalkyl (meth)acrylates containing primary, secondary and/or tertiary OH groups,
  a2) 40–93% by weight of (cyclo)alkyl esters of (meth)acrylic acid having 1 to 18 carbon atoms in the (cyclo)alkyl radical,
  a3) 0–10% by weight of (meth)acrylic acid,
  a4) 0–30% by weight, preferably 0–10% by weight, of multiple (meth)acrylic esters of polyalcohols,
  a5) 0–40% by weight, preferably 0–35% by weight, of comonomers other than a1 to a4,
the sum of the parts by weight of components a1 to a5 being 100%, and component a1 being selected with the proviso that at least 40% of the OH groups of the polyhydroxypolyacrylate a are attached to secondary or tertiary carbon atoms, and the polyhydroxypolyacrylate a having an OH number of from eferably from 70 to 170, an acid number of from 0 to 35, an average molar mass (number average determined by means of the GPC method against polystyrene standard) of from 1700 to 18,000, and a glass transition temperature of from 45 to 75° C.

16. The powder coating slurry as claimed in claim 1, wherein he crosslinking agent B has an NCO content of from 12 to 23% by weight, with an average NCO functionality of at least 2.4, and contains less than 1.5% by weight of monomeric diisocyanates having a molecular weight of less Fan 300, and wherein the crosslinking agent B has a glass transition temperature of from 50 to 135° C.

17. A coated article comprising a motor vehicle body or a motor vehicle body part, where, following the application if desired of a primer and/or a primer-surfacer, a decorative topcoat material is applied to the substrate and subsequently, following preliminary drying, a powder clearcoat slurry according to claim 1 is applied, using customary spray application equipment, and the topcoat and the powder clearcoat, following further preliminary drying if desired, are baked together.

18. The powder coating slurry of claim 1, wherein the isocyanate groups of the at least one polyisocyanate crosslinking agent are reacted with the deactivator in an amount of from greater than 25 up to 30 mole % based on the isocyanate groups.

19. The powder coating slurry of claim 1, wherein from 90 to 100% of the OH groups of the polyhydroxypolyacrylate are attached to secondary or tertiary carbon atoms.

* * * * *